July 24, 1962
J. L. MURRAY
3,045,611
FLUID PRESSURE DEVICES
Filed Jan. 16, 1958
2 Sheets-Sheet 1
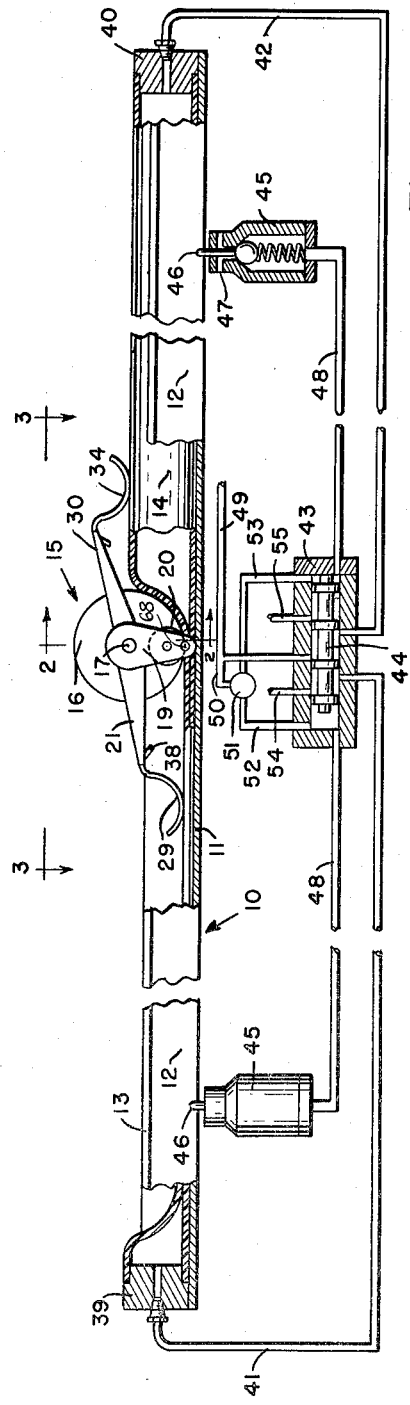
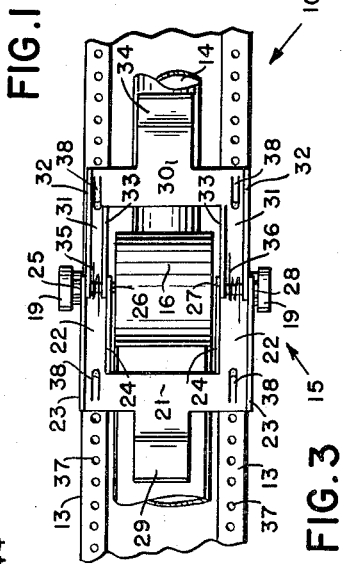
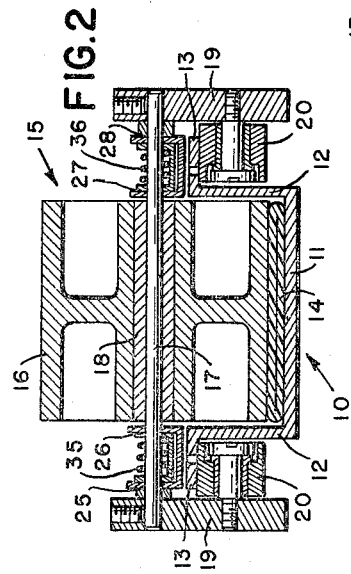
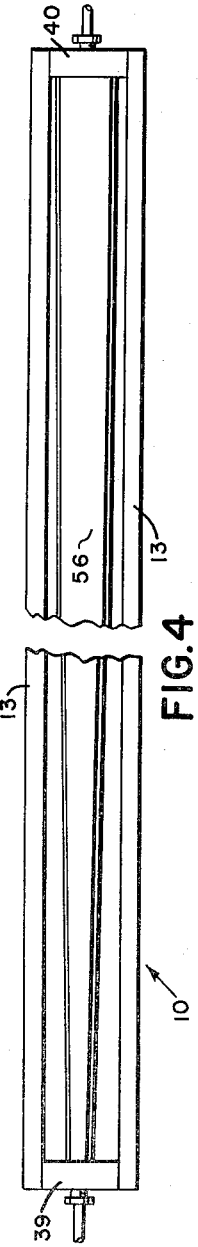
INVENTOR.
JEROME L. MURRAY
BY
Pollard Johnston Smyther & Robertson
ATTORNEYS July 24, 1962 J. L. MURRAY 3,045,611
FLUID PRESSURE DEVICES Filed Jan. 16, 1958 2 Sheets-Sheet 2

INVENTOR.
JEROME L. MURRAY
BY
Pollard Johnston Smythe & Robertson
ATTORNEYS.

United States Patent Office 3,045,611
Patented July 24, 1962

3,045,611
FLUID PRESSURE DEVICES
Jerome L. Murray, 401 E. 58th St., New York, N.Y.
Filed Jan. 16, 1958, Ser. No. 709,327
30 Claims. (Cl. 104—155)

The present invention relates to flexible tube fluid pressure actuators, and in particular to improvements in devices of the kind having a resilient tube section and presser means movable along the tube section to serve as a fluid pressure actuator for propelling a member along a given path of travel.

Although flexible tube fluid pressure devices have been proposed in many forms, they have found little practical acceptance in fields in which relatively large forces are required to be overcome or, in fact, where continued un- interrupted operation or intermittent operations are required over long periods of time.

In such cases where relatively large forces are required to be overcome in propelling a member along a given path such, for example, as in elevator or conveying systems, any leakage of the pressure fluid past the presser means will operate to lessen the effectiveness of the propelling apparatus and in some instances may prevent the accomplishment of the desired results.

The principal object of this invention is to provide a fluid operated actuator capable of propelling a member along a straight path, a curved path or any combination of straight and curved paths, either reciprocably or continuously in one direction.

Another object of this invention is to provide such an actuator in which the member being propelled is prevented from moving in the event of failure of the fluid operated propelling means.

Another object of this invention is to provide such an actuator in which its efficiency of operation increases with increased propelling force being applied to it by the flexible tube.

Another object of this invention is to provide such an actuator in which the presser means acts to force the flexible tube to a completely collapsed condition as the propelling pressure of the fluid within the tube increases.

Another object of this invention is to provide such an actuator in which varying degrees of propelling force may be employed at predetermined points in the path of movement of the propelled member.

According to one feature of the invention there is provided a fluid pressure device for propelling a member along a predetermined path, comprising a collapsible hose extending along the path, a propelling means such as a roller bearing against one side of the hose and rollable along the hose by fluid pressure admitted into a portion of the hose to one side of the roller, a counteracting means such as a roller or rollers which act counter to the propelling roller, and a tiltable interconnecting means such as a link interconnecting the propelling roller and the counter roller or rollers and engaging the member to be propelled. There is further provided backing means such as track or tracks or other suitable structure, which extend along the hose and which serve to support and guide the propelling roller and the counter roller or rollers, whereby as fluid pressure is admitted to the hose the interconnecting means are tilted and the portion of the hose located between the propelling roller and the backing means is held in a tightly compressed or collapsed condition to prevent leakage of pressure fluid past the propelling roller.

This tightly compressed condition of the hose is brought about by the fact that as the interconnecting links or the like are tilted by the force of the pressurized fluid acting upon the propelling roller, the propelling roller and the counter rollers are caused to exert counter actions against the backing means to thereby squeeze the hose between the propelling roller and its backing member.

According to one embodiment of the invention, the backing means comprises a generally channel-shaped track structure the base of which supports the hose with the propelling roller disposed on the hose, and the side walls of which are provided with lateral flanges forming along their under sides tracks engaged by counter rollers located at opposite sides of the track structure, the counter rollers and the propelling roller being interconnected by rigid tiltable links so that their axes lie in a single plane. The several rollers and their interconnecting links together constitute a carriage to be engaged by and to move along the hose member to be propelled.

In this embodiment, when the collapsible tube is not subjected to fluid pressure, the plane occupied by the axis of the propelling roller and the axes of the counter rollers lies transverse to the path along which it is desired to propel the member. Introducing fluid under pressure into one end of the hose will cause a propelling force to be exerted against the propelling roller, which force acts to move the carriage along the hose in the direction toward the other end of the hose and to tilt the carriage in that direction, thereby forcing the portion of the hose located between the propelling roller and the base of the track structure to a tightly collapsed condition by the counter actions of the propelling roller and the counter rollers against their respective tracks.

Another aspect of the invention is to provide a rack-like means along the track structure that cooperates with a toothed means on the carriage. This toothed means is rendered effective by the absence of fluid under pressure within, and the collapsed condition of the hose member. Accordingly, this rack and tooth means will prevent movement of the propelled member in either direction when the pressure fluid causing movement in that direction is exhausted.

In another aspect of the invention, a substantially constant force may be applied to the propelled device along its path of travel by employing a flexible hose member of substantially constant internal cross-sectional shape, whereas varying forces may be applied to the propelled device by employing a flexible hose member of varying internal cross-sectional shape.

In another aspect of the invention, the supporting means for the flexible hose comprises a flat, substantially rigid plate member that may be located within the flexible hose as shown in FIG. 6; or it may be located on the outside of, and integrally attached to the flexible hose as shown in FIG. 5.

The above, other objects and novel features of the invention will become apparent from the following specification and accompanying drawings which are merely exemplary.

In the drawings:

FIGURE 1 is an elevational view of an actuator to which the principles of the invention have been applied;

FIG. 2 is a sectional elevational view taken substantially along line 2—2 of FIG. 1;

FIG. 3 is a top plan view along line 3—3 of FIG. 1;

FIG. 4 is a top plan view of the track of FIG. 1 with a modified hose therein;

Figure 6:
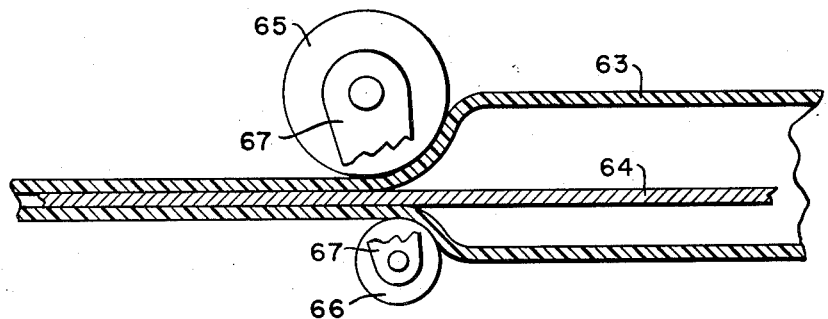
FIG. 6 is still another form of the apparatus embodying the principles of the invention.

Referring to FIGS. 1 and 2, the principles of the invention are shown as applied to the reciprocating system including a track member 10 which is generally channel-shaped. It is shown as straight, although it may follow any desired straight, curved or combination of straight and curved paths. The track 10 includes a bottom 11 to which parallel walls 12 are integrally attached. Flanges 13 extend outwardly from the walls 12 for a purpose to be described later.

A collapsible resilient hose 14 is positioned between the walls 12 and lies on the bottom 11 of the track 10. The construction of the hose is such that it is normally in a collapsed condition, as shown to the left of FIG. 1, but will expand when internally subjected to fluid pressure to an expanded condition, as shown to the right of FIG. 1, in which condition it may assume a cylindrical or less than cylindrical shape. It may be made up of a fabric-embedded rubber material and may comprise a natural or synthetic rubber or other suitable flexible and resilient material preferably having at least one layer of fabric, cord or other inelastic reinforcement embedded therein. The flexible and resilient material hose also may be of braided metal construction or other types of metal hose, and the term "flexible" is meant to include such herein.

Although other forms of such a hose may be employed, and not limiting the apparatus of this invention to it, that which is shown, described and claimed in co-pending application Serial No. 525,296, filed July 29, 1955, now Patent No. 2,987,004, will produce some of the desired results.

The hose 14 is preferably anchored to the track 10 by any suitable means such as adhesives, or vulcanizing a bottom portion thereof to the bottom 11 of track or support 10.

A carriage 15 is provided for cooperation with the hose 14 and track 10, and it includes a propelling roller 16 having a width that will fit, with clearance on each side, between the walls 12 of track 10. Its diameter may be of any value and is shown in the drawings as being substantially twice the diameter of the hose 14. A shaft 17 extends through the roll 16 and bearing 18 which is provided for journaling roll 16 on shaft 17. Pendants or links 19 are fixed to the outer extremities of shaft 17 and they carry counter rolls 20 at their lower ends in aligned relation. The pendants are provided at a location thereon below the axis of the rolls 20 with suitable means 68 whereby the member to be propelled may be attached to the carriage. The construction is such that rolls 20 coact with the undersides of the outwardly extending flanges 13, providing what might be termed a freely tilting construction of the pendants 19 so as to force the roll 16 against the hose 14 in a manner to maintain it in a collapsed condition at the point of contact between the roll 16 and the hose 14. Furthermore, an important feature of this invention is that the axes of roll 16 and rolls 20 lie within a substantially vertical plane when no pressure fluid is within the hose 14. When pressure fluid is introduced to the interior of the hose 14 on either side of the carriage 15, an unbalanced moment is set up about the axis of the rolls 20 causing the pendants 19 to tilt in the direction of the propelling force. This tilting action increases the pinching or collapsing action of the roll 16 thereby to insure against excessive leakage of the pressure fluid through hose 14 past the roll 16. The magnitude of the unbalanced moment, and thus the amount of tilting occurring in the movement of the rolls to an equilibrium position, are augmented by the resistive force or load of the member to be propelled which is secured to the pendants.

An arm member 21 includes channel-shaped leg members 22 (FIG. 3) having upturned side walls 23 and 24 that are provided with aligned holes 25, 26, 27 and 28 for receiving shaft 17. The arm 21 may include a finger portion 29 of curvilinear or suitable form so as to ride on the hose 14 without catching on it.

A similar arm 30, having channel-shaped legs 31 (FIG. 3) with upturned walls 32 and 33, is also pivotally mounted on shaft 17 in the same way that arm 21 is pivotally mounted thereon. The arm 30 also includes a finger portion 34 similar to portion 29 of arm 21. Torsion springs 35 and 36 surrounding shaft 17 act on the walls 24 and 32, thereby resiliently urging the arms 21 and 30 into contact with the hose 14.

One or both of the flanges 13 is provided with a series of equally spaced holes 37 for cooperation with depressed cut-out portions or locking lugs 38 in the leg members 22 and 31. The depressions 38 are of such extent that when the hose 14 is collapsed on each side of the roll 16, they fit within the holes 37, thereby preventing motion of the carriage 15 in either direction. However, upon the admission of fluid under pressure to the hose 14 on either side of the carriage 15, the corresponding arm 21 or 30 is pivoted about shaft 17 so that the corresponding depression 38 rises out of the hole 37 within which it was located. As the carriage moves, the other depression 38 merely rides over successive holes 37 without interfering with the motion of the carriage 15.

The present embodiment discloses a reciprocable actuator and, as such, the hose 14 is adapted alternately to be supplied with fluid under pressure to each of its ends. Accordingly, the ends of hose 14 are provided with fluid pressure-tight fittings 39 and 40 to which supply lines 41 and 42 are connected. The lines 41 and 42 are in turn connected to a valve housing 43 within which a reciprocable spool valve 44 is mounted. In order to shift valve spool 44 to provide reversal of the carriage 15, identical check valves 45 are located along the track 10 any predetermined distance apart. The plungers 46 of the valves 45 are located in position to be depressed by the bottom portion of the pendant 19 passing over them. The check valves include an exhaust port 47, and a line 48 from each extends into opposite ends of the valve housing 43.

A supply line 49 admits fluid under pressure to the valve housing 43 and it includes a branch 50 that leads to a pressure reducing valve 51 from the latter of which lines 52 and 53 lead to the housing 43 at opposite ends thereof so that constant pressure acts at all times on both ends of spool 44 when valves 45 are closed. Consequently, under such conditions, spool 44 remains in any position to which it has been moved. However, opening either valve 45 will exhaust the corresponding end of housing 43, thereby causing the spool 44 to move to that end.

With the apparatus in the condition shown in the drawings, pressure fluid from line 49 is passing through line 42 and has inflated hose 14 on the righthand side of the carriage 15, thereby elevating arm 30 to disengage its depressed element 38, and said pressure fluid is propelling the carriage 15 leftwardly. The depressed element 38 in arm 21 merely rides over the notches formed by the holes 37 in flange 13. Fluid within the hose 14 on the lefthand side of the carriage 15 exhausts through line 41 to an exhaust port 54 in valve housing 43.

When the bottom of the pendant 19 depresses plunger 46 of the lefthand valve 45, the lefthand end of housing 43 is exhausted. The pressure fluid in the righthand end of housing 43 shifts valve spool 44 to the left, causing pressure fluid from supply line 49 to pass through line 41 to the lefthand end of hose 14, thereby elevating arm 21 so that its depressed element 38 does not engage the notches formed by the holes 37 in flange 13. The pressure fluid within hose 14 on the righthand side of carriage 15 exhausts through line 42 and an exhaust port 55 in housing 43. Accordingly, the carriage 15 is propelled rightwardly until the bottom of pendant 19 depresses the plunger 46 of the righthand valve 45 when the movement of carriage 15 is reversed as previously explained.

Should the application to which the invention is applied require an increasing propelling force in one direction of travel and a decreasing propelling force in the opposite direction, a hose 56 shown in FIG. 4 may be substituted for the hose 14 of FIGS. 1 and 2. With such a modification, as the internal diameter of the hose increases, the propelling force increases and vice versa.

Figure 5:
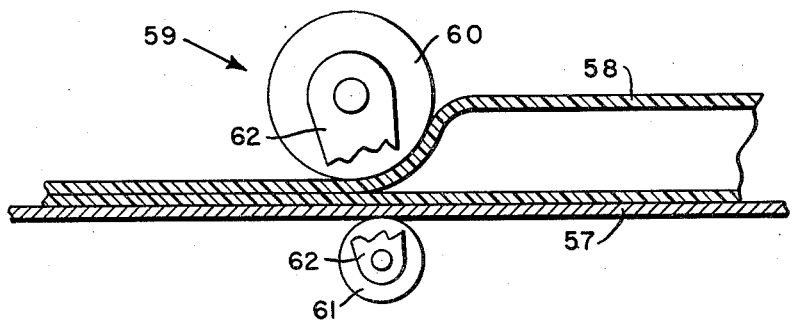
FIG. 5 is a modified form of the apparatus embodying the principles of the invention.

Referring to FIG. 5, the principles of the invention are shown as applied to an actuator including a flat, substantially rigid plate member 57 that may be supported at each end by any conventional means. The flexible tube 58 may have a portion of its bottom surface adhesively or otherwise integrally attached to the top surface of the plate 57. The carriage 59 is shown schematically and may take substantially the form of the carriage 15 of FIG. 1. It includes a roll 60 adapted to engage the top surface of the hose 58, and a roll 61 adapted to contact the bottom surface of the plate 57. The rolls 60 and 61 are journaled on vertically spaced, parallel, horizontally disposed pins fixed to parallel, horizontally spaced, vertically disposed pendants 62 (only one being shown). The force produced by the pressure fluid within the hose 58 together with the resistive force or load of the member secured to the pendants causes the pendants 62 to tilt in the direction of movement of the carriage 59, thereby exerting a pinching action between the roll 60 and the plate 57 thus providing a maximum collapsing action to the hose 58.

Referring to FIG. 6, the flexible hose 63 may be provided with a flat, substantially rigid plate member 64 located within the hose 63 and hermetically sealed to at least one end thereof. The rolls 65 and 66 may be mounted on pendants 67 (only one being shown) in the same manner that rolls 60 and 61 are mounted on pendants 62. The rolls 65 and 66 are preferably of different diameters in order to insure tilting of the carriage in the direction of its movement to provide maximum pinching of the hose 63 between the rolls 65, 66 and the plate 64.

Although the various features of the new and improved fluid pressure actuator have been shown and described in detail to fully disclose four embodiments of the invention, it will be evident that numerous changes may be made in such details, and certain features may be used without others without departing from the principles of the invention.

What is claimed is:

1. A fluid operated actuator comprising in combination, a track member; a flexible hose supported by said track member; a carriage having a roller journaled therein and having means for forcing said roller into intimate contact with said hose to compress said hose at the point of contact of said roller therewith, said means including roller means journaled on pendant means pivoted on the axis of said roller, said roller means coacting with said track; and means for alternately supplying pressure fluid to opposite ends of said hose.

2. A fluid operated actuator comprising in combination, a generally channel-shaped track member having oppositely disposed flanges extending outwardly from the free ends of the side walls thereof; a flexible hose within said channel and confined between said side walls thereof; a carriage including a roll adapted to ride along said hose between said side walls of said track member; pendant means pivoted on the axis of said roll; roll means journaled on said pendant means and in rolling contact with the under surface of said flanges, the construction and arrangement of the parts being such that the roll that rides on said hose maintains it locally collapsed; means for supplying fluid under pressure to one end of said hose, and means responsive to said carriage arriving at a point near the other end of said hose for rendering ineffective the pressure fluid within said hose.

3. A fluid operated actuator comprising in combination, a generally channel-shaped track member having oppositely disposed flanges extending outwardly from the free ends of the side walls thereof; a flexible hose within said channel and confined between said side walls; a carriage including a roll adapted to ride on and along said hose between said side walls; roll means on said carriage and having an axis in the plane including the axis of said roll, said roll means being in rolling contact with the under surfaces of said flanges, the construction and arrangement of the parts being such that the roll that rides on said hose compresses said hose due to a counter action of the roll means contacting said flanges; and means for alternately supplying pressure fluid to opposite ends of said hose.

4. A fluid operated actuator comprising in combination, a generally channel-shaped track member having oppositely disposed flanges extending outwardly from the free ends of the side walls thereof; a flexible hose within said channel and confined between said side walls; a carriage including a roll adapted to ride on and along said hose between said side walls, roll means on said carriage in rolling contact with the under surfaces of said flanges and having an axis in the same plane including the axis of said roll, the construction and arrangement of the parts being such that the roll that rides on said hose maintains it locally collapsed due to the counter action of the roll means contacting said flanges; means for alternately supplying pressure fluid to opposite ends of said hose to cause propulsion of said carriage in opposite directions; and means on said carriage for preventing its movement in either direction when the pressure fluid causing movement in that direction is exhausted.

5. A fluid operated actuator comprising in combination, a linear track member; a flexible hose having a varying internal cross-section supported by said track member; a carriage having a roller journaled therein; means for forcing said roller into intimate contact with said hose to compress said hose at the point of contact therewith; and means for alternately supplying pressure fluid to opposite ends of said hose.

6. A fluid operated actuator comprising in combination, a linear track member; a flexible hose having a progressively increasing internal cross-section from one end to the other end supported by said track member; a carriage having a roller journaled therein; means for forcing said roller into intimate contact with said hose to compress said hose at the point of contact therewith; and means for alternately supplying pressure fluid to opposite ends of said hose.

7. A fluid operated actuator comprising in combination, a hose, a carriage adapted to move along said hose, a roller on said carriage engaging and adapted to compress one side of said hose, roller means carried by said carriage along the other side of said hose in position to bear toward said hose oppositely to the bearing of said roller against said one side, the portion of said hose extending to one side of said roller being normally in a collapsed condition, means to supply fluid under pressure into the portion of said hose on the other side of said roller, said fluid tending to expand said hose and thus to force said roller and said carriage along the normally collapsed portion of the hose, said carriage including means responsive to the forcing of said roller along said collapsed portion to increase the pressure of said roller against said collapsed portion.

8. A fluid operated actuator comprising in combination, a hose, a carriage adapted to move along said hose, means on said carriage engaging one side of said hose, other means carried by said carriage in cooperative engagement with the other side of the hose, said carriage means maintaining said hose in a collapsed condition at a point along said hose where said carriage is located, means to supply fluid under pressure to one end of said hose, said fluid tending to expand said hose and move said carriage away from said end of said hose, and means responsive to said hose expansion to increase the collapsing effect on said hose by said carriage means.

9. A fluid operated actuator as claimed in claim 8 in which said carriage means includes rollers disposed on opposite sides of the hose and said responsive means includes tiltable arms between said rollers whereby a tilting of said arms from a plane transverse to the path of movement of the carriage will decrease the effective distance between the rollers.

10. A fluid operated actuator as claimed in claim 8 in which means forming a track is mounted between one side of the hose and the adjacent carriage engaging means, said track and said carriage having cooperating elements to prevent movement of the carriage with respect to the track, and means on the carriage and responsive to the size of the hose to engage said cooperating elements.

11. A fluid pressure device for propelling a member along a predetermined path, comprising a collapsible hose extending along said path, a propelling roller bearing against one side of said hose and rollable therealong by fluid pressure admitted into the portion of said hose to one side of said roller, roller means acting counter to said propelling roller, backing means extending along said hose for supporting and guiding said roller and said roller means, respectively, and tiltable means interconnecting said roller and said roller means and adapted to be engaged by the member to be propelled, whereby in response to said fluid pressure said tiltable means are tilted, and by counter actions of said roller and said roller means the portion of said hose engaged by said roller is held compressed against said backing means while said roller is being moved along said hose.

12. A device as claimed in claim 11, said backing means being at one side of said hose, said roller means bearing against one side of said backing means and said propelling roller bearing against the opposite side thereof through a portion of the hose.

13. A fluid pressure device for propelling a member along a predetermined path comprising a collapsible hose extending along said path, a propelling roller bearing against one side of said hose and rollable therealong by fluid pressure admitted into one end of said hose, roller means acting counter to said propelling roller, a backing member extending along said hose for supporting and guiding said roller and said roller means, respectively, on opposite sides thereof, tiltable links interconnecting the axes of said roller and said roller means and adapted to be engaged by the member to be propelled, whereby in response to said fluid pressure said roller is moved along said hose in the direction toward the other end of said hose and said links together with said roller and said roller means are caused to tilt in said direction to hold that portion of the hose engaged between said roller and said backing member in a tightly collapsed condition.

14. A fluid operated actuator comprising in combination, means defining a track; a flexible, collapsible hose extending along and in engagement with said track; a carriage adapted to be propelled along said track; said carriage comprising propelling means operable upon said hose for compressing said hose at a point along said hose where said carriage is located; means for supplying fluid under pressure to one end of said hose to thereby produce a propelling force acting upon said propelling means to move said carriage in the direction of the other end of said hose; and means responsive to said carriage arriving at a point near said other end of said hose for rendering ineffective the pressure fluid within said hose.

15. A fluid operated actuator comprising in combination, a supporting member; a flexible, collapsible hose supported by said supporting member; a carriage adapted to be propelled along said hose; said carriage comprising propelling means operable upon said hose for compressing said hose at a point along said hose where said carriage is located; means for supplying fluid under pressure to one end of said hose to thereby produce a propelling force acting upon said propelling means to move said carriage in the direction of the other end of said hose; and means responsive to the force exerted on said carriage by said pressurized hose for increasing the compressing effect on said hose at the point along said hose where said carriage is located.

16. A fluid operated actuator comprising in combination, a supporting member; a flexible, collapsible hose supported by said supporting member; a carriage adapted to be propelled along said hose; said carriage comprising propelling means operable upon said hose for compressing said hose at a point along said hose where said carriage is located, said means including a roller bearing upon said hose, oppositely acting roller means, and freely tilting means for journaling said roller and said roller means; and means for supplying fluid under pressure to one end of said hose to thereby produce a propelling force acting upon said propelling means to move said carriage and to tilt said freely tilting means in the direction toward the other end of said hose.

17. A fluid operated actuator comprising in combination, means defining a track; a flexible, collapsible hose extending along and in engagement with said track; a carriage adapted to be propelled along said track; said carriage comprising propelling means operable upon said hose for compressing said hose at a point along said hose where said carriage is located; means responsive to pressure fluid within said hose for increasing the compressing effect of said propelling means; means for supplying fluid under pressure to one end of said hose to thereby produce a propelling force acting upon said propelling means to move said carriage in the direction of the other end of said hose; and means responsive to said carriage arriving at a point near said other end of said hose for rendering ineffective the pressure fluid within said hose.

18. A fluid operated actuator comprising in combination, means defining a track; a flexible, collapsible hose extending along and in engagement with said track; a carriage adapted to be propelled along said track; said carriage comprising propelling means operable upon said hose for compressing said hose at a point along said hose where said carriage is located; means responsive to pressure fluid within said hose for increasing the compressing effect of said propelling means; means for supplying fluid under pressure to one end of said hose to thereby produce a propelling force acting upon said propelling means to move said carriage in the direction of the other end of said hose; means responsive to said carriage arriving at a point near the other end of said hose for rendering ineffective the pressure fluid within said hose; and means on said carriage responsive to fluid pressure in the hose for preventing movement of the carriage in either direction when the pressure fluid causing movement in that direction is exhausted.

19. A fluid operated actuator comprising in combination means defining a track; a flexible, collapsible hose extending along and in engagement with said track; a carriage adapted to be propelled along said track; roller means on said carriage embracing said track for compressing said hose at a point along said hose where said carriage is located; means responsive to pressure fluid within said hose for increasing the compressing effect of said roller means; means for supplying fluid under pressure to one end of said hose to thereby produce a propelling force acting upon said roller means to move said carriage in the direction of the other end of said hose; and means responsive to said carriage arriving at a point near said other end of said hose for rendering ineffective the pressure fluid within said hose.

20. A fluid operated actuator comprising in combination, means defining a track; a flexible, collapsible hose extending along and in engagement with said track; a carriage adapted to be propelled along said track; said carriage comprising propelling means operable upon said hose for compressing said hose at a point along said hose where said carriage is located; alternately operable means for supplying fluid under pressure first to one end of said hose while exhausting the fluid from the other end thereof, to thereby produce a propelling force acting upon said propelling means to move said carriage in the direction of said other end of said hose; and thence to supply fluid in the reverse order to reverse the movement of the carriage, said alternately operable means being responsive to said carriage arriving at a point near each end of said hose for reversing the pressure fluid within said hose.

21. A fluid operated actuator comprising in combination, means defining a track; a flexible, collapsible hose extending along said track; a carriage adapted to be propelled along said track; said carriage comprising propelling means operable upon said hose for compressing said hose at a point along said hose where said carriage is located; means for supplying fluid under pressure to one end of said hose to thereby produce a propelling force acting upon said propelling means to move said carriage in the direction of the other end of said hose; means responsive to said carriage arriving at a point near said other end of said hose for rendering ineffective the pressure fluid within said hose; and pivotally mounted means on said carriage responsive to the pressure in the hose for cooperating with means on said track for preventing movement of the carriage in either direction when the pressure fluid causing movement in that direction is exhausted.

22. A fluid operated actuator comprising in combination, means defining a track; a collapsible hose having a varying internal diameter and extending along and in engagement with said track; a carriage adapted to be propelled along said track; said carriage comprising propelling means operable upon said hose for comprising said hose at a point along said hose where said carriage is located; means for supplying fluid under pressure to one end of said hose to thereby produce a propelling force acting upon said propelling means to move said carriage in the direction of the other end of said hose; and means responsive to said carriage arriving at a point near said other end of said hose for rendering ineffective the pressure fluid within said hose.

23. A fluid operated actuator comprising in combination, means defining a track; a collapsible hose having a varying internal diameter and extending along and in engagement with said track; a carriage adapted to be propelled along said track; said carriage comprising propelling means operable upon said hose for compressing said hose at a point along said hose where said carriage is located; means responsive to pressure fluid within said hose for increasing the compressing effect of said propelling means; means for supplying fluid under pressure to one end of said hose to thereby produce a propelling force acting upon said propelling means to move said carriage in the direction of the other end of said hose; and means responsive to said carriage arriving at a point near said other end of said hose for rendering ineffective the pressure fluid within said hose.

24. A fluid operated actuator comprising in combination, means defining a track; a flexible, collapsible hose having a progressively varying internal diameter and extending along and in engagement with said track; a carriage adapted to be propelled along said track; said carriage comprising propelling means operable upon said hose for compressing said hose at a point along said hose where said carriage is located; means for supplying fluid under pressure to one end of said hose to thereby produce a propelling force acting upon said propelling means to move said carriage in the direction of the other end of said hose; and means responsive to said carriage arriving at a point near said other end of said hose for rendering ineffective the pressure fluid within said hose.

25. A fluid operated actuator comprising in combination, a track member; a flexible hose supported by said track member; a carriage movable along said track member and having a propelling roller journaled therein and having means for forcing said roller into intimate contact with said hose to compress said hose at the point of contact of said roller therewith; means to increase the compressing effect of said roller in response to pressure fluid in said hose and means for alternately supplying pressure fluid to opposite ends of said hose to propel said carriage in opposite directions along said track member.

26. A fluid operated actuator comprising in combination, a linear track member; a flexible hose supported by said track member; a carriage having a roller journaled therein; means for forcing said roller into intimate contact with said hose to compress said hose at the point of contact therewith; means for alternately supplying pressure fluid to opposite ends of said hose to cause propulsion of said carriage in opposite directions; and means on said carriage positioned by a portion of the hose trailing the carriage for preventing movement of the carriage in either direction when the pressure fluid causing movement in that direction is exhausted.

27. A fluid operated actuator comprising in combination, a linear track member; a flexible hose supported by said track member; a carriage having a roller journaled therein; means for forcing said roller into intimate contact with said hose to compress said hose at the point of contact therewith; means for alternately supplying pressure fluid to opposite ends of said hose to cause propulsion of said carriage in opposite directions; means responsive to said carriage arriving at a point near the exhaust end of said hose for rendering ineffective the pressure fluid within said hose; and means on said carriage for preventing movement of the carriage in either direction when the pressure fluid causing movement in that direction is exhausted.

28. A fluid operated actuator comprising in combination, means defining a track; a flexible, collapsible hose extending along said track; a carriage adapted to be propelled along said track and including propelling means for compressing said hose at a point along said hose where said carriage is located; means for supplying fluid under pressure to one end of said hose to thereby produce a propelling force acting upon said propelling means to move said carriage in the direction of the other end of said hose; means responsive to said carriage arriving at a point near the said other end of said hose for rendering ineffective the pressure fluid within said hose; and means on said carriage for preventing its movement in either directon when the pressure fluid causing movement in that direction is exhausted.

29. A fluid operated actuator comprising in combination, a flexible, collapsible hose; a substantially rigid supporting member extending axially interiorly of said hose, a carriage adapted to be propelled along said hose and including propelling roller means for maintaining said hose in a collapsed condition at a point along said hose where said carriage is located, said carriage also including freely tilting means for journaling both said propelling roller means and counter roller means of different diameter acting oppositely to said propelling roller means; and means for supplying fluid under pressure to the one end of said hose to thereby produce a propelling force to said propelling roller means and a tilting action of said freely tilting means in the direction toward the other end of said hose.

30. A fluid operated actuator comprising in combination, a flat substantially rigid supporting means; a flexible, collapsible hose extending along said rigid supporting means and integrally attached thereto; a carriage adapted to be propelled along said hose; said carriage comprising propelling means operable upon said hose for compressing said hose at a point along said hose where said carriage is located, said propelling means including a roller bearing upon said hose, oppositely acting roller means, and freely tilting means for journaling said roller and said roller means and means for supplying fluid under pressure to one end of said hose to thereby produce a propelling force acting upon said propelling means to move said carriage and to tilt said freely tilting means in the direction toward the other end of said hose.

References Cited in the file of this patent

UNITED STATES PATENTS

| | | |
|---|---|---|
| 236,555 | Conger | Jan. 11, 1881 |
| 250,787 | Conger et al. | Dec. 13, 1881 |
| 1,289,653 | Castano | Dec. 31, 1918 |
| 1,682,974 | Lukens | Sept. 4, 1928 |
| 2,227,807 | Dixon | Jan. 7, 1941 |
| 2,323,665 | Lundvall | July 6, 1943 |
| 2,367,492 | Fickett et al. | Jan. 16, 1943 |
| 2,412,598 | Brush | Dec. 17, 1946 |
| 2,566,962 | Ramsey | Sept. 4, 1951 |

FOREIGN PATENTS

| | | |
|---|---|---|
| 37,197 | Germany | Sept. 23, 1886 |
| 11,918 | Great Britain | 1847 |
| 22,445 | Great Britain | 1896 |

UNITED STATES PATENT OFFICE
CERTIFICATE OF CORRECTION

Patent No. 3,045,611                                    July 24, 1962

Jerome L. Murray

It is hereby certified that error appears in the above numbered patent requiring correction and that the said Letters Patent should read as corrected below.

Column 5, line 69, strike out "thereof"; same line 69, after "ride" insert -- on and --; line 70, strike out "of said track member".

Signed and sealed this 30th day of October 1962.

(SEAL)
Attest:

ERNEST W. SWIDER
Attesting Officer

DAVID L. LADD
Commissioner of Patents